United States Patent
Ino

(10) Patent No.: US 8,169,494 B2
(45) Date of Patent: May 1, 2012

(54) IMAGE SENSING APPARATUS AND METHOD OF CONTROLLING IMAGE SENSING APPARATUS

(75) Inventor: Kazuya Ino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 561 days.

(21) Appl. No.: 12/342,239

(22) Filed: Dec. 23, 2008

(65) Prior Publication Data

US 2009/0180012 A1   Jul. 16, 2009

(30) Foreign Application Priority Data

Jan. 15, 2008   (JP) ................................. 2008-006286

(51) Int. Cl.
*H04N 5/225* (2006.01)
(52) U.S. Cl. .................... 348/220.1; 348/221.1; 348/362
(58) Field of Classification Search ................ 348/221.1
See application file for complete search history.

(56) References Cited

U.S. PATENT DOCUMENTS

| | | | |
|---|---|---|---|
| 6,734,901 B1 * | 5/2004 | Kudo et al. | 348/208.4 |
| 7,978,240 B2 * | 7/2011 | Kido et al. | 348/276 |
| 2005/0237422 A1 * | 10/2005 | Kido | 348/362 |
| 2006/0264733 A1 * | 11/2006 | Masaki | 600/407 |
| 2008/0079814 A1 * | 4/2008 | Nobuoka | 348/208.99 |
| 2009/0213237 A1 * | 8/2009 | Ishida | 348/221.1 |

FOREIGN PATENT DOCUMENTS

| | | |
|---|---|---|
| JP | 09-023371 | 1/1997 |
| JP | 2005-277513 | 10/2005 |

* cited by examiner

*Primary Examiner* — Jason Chan
*Assistant Examiner* — Abdelaaziz Tissire
(74) *Attorney, Agent, or Firm* — Cowan, Liebowitz & Latman, P.C.

(57) ABSTRACT

An image sensing apparatus comprises: a pixel array including a first pixel group and a second pixel group; a first readout unit which reads out a first signal from the first pixel group in a readout period which remains constant regardless of the operation modes; a second readout unit which reads out a second signal from the second pixel group in a readout period selected in accordance with a switched operation mode between the operation modes; and a control unit which controls a performance of generating an evaluation value by using the first signal of the first pixel group, and which controls at least one of image displaying performance and image recording performance by using the second signal of the second pixel group.

4 Claims, 9 Drawing Sheets

FIG. 5

| VERTICAL ADDRESS | 19 | | | | | | | | 21 | | | | | | |
|---|---|---|---|---|---|---|---|---|---|---|---|---|---|---|---|
| HORIZONTAL ADDRESS | 1 | 2 | 3 | 4 | 5 | 6 | 7 | ... | 1 | 2 | 3 | 4 | 5 | 6 | 7 | ... |
| PIXEL INTERPOLATION CONTROL SIGNAL | 0 | 1 | 0 | 1 | 0 | 1 | 0 | ... | 0 | 1 | 0 | 1 | 0 | 1 | 0 | ... |
| INPUT (FIRST PIXEL GROUP) | | S(19,2) | | S(19,4) | | S(19,6) | | ... | | S(21,2) | | S(21,4) | | S(21,6) | | ... |
| INPUT (SECOND PIXEL GROUP) | S(19,1) | | S(19,3) | | S(19,5) | | S(19,7) | ... | S(21,1) | | S(21,3) | | S(21,5) | | S(21,7) | ... |
| OUTPUT | S(19,1) | S(19,2) | S(19,3) | S(19,4) | S(19,5) | S(19,6) | S(19,7) | ... | S(21,1) | S(21,2) | S(21,3) | S(21,4) | S(21,5) | S(21,6) | S(21,7) | ... |

FIG. 6

| VERTICAL ADDRESS | 20 | | | | | | | 21 | | | | | | |
|---|---|---|---|---|---|---|---|---|---|---|---|---|---|---|
| HORIZONTAL ADDRESS | 1 | 2 | 3 | 4 | 5 | 6 | 7 | ... | 1 | 2 | 3 | 4 | 5 | 6 | 7 |
| PIXEL INTERPOLATION CONTROL SIGNAL | 0 | 0 | 0 | 0 | 0 | 0 | 0 | ... | 0 | 2 | 0 | 2 | 0 | 2 | 0 |
| INPUT (FIRST PIXEL GROUP) | S(20,1) | | | | | | | ... | S(21,1) | | S(21,3) | | S(21,5) | | S(21,7) |
| INPUT (SECOND PIXEL GROUP) | S(20,1) | S(20,2) | S(20,3) | S(20,4) | S(20,5) | S(20,6) | S(20,7) | ... | S(21,1) | | S(21,3) | | S(21,5) | | S(21,7) |
| OUTPUT | S(20,1) | S(20,2) | S(20,3) | S(20,4) | S(20,5) | S(20,6) | S(20,7) | ... | S(21,1) | (S(21,1)+S(21,3))/2 | S(21,3) | (S(21,3)+S(21,5))/2 | S(21,5) | (S(21,5)+S(21,7))/2 | S(21,7) |

IMAGE SENSING APPARATUS AND METHOD OF CONTROLLING IMAGE SENSING APPARATUS

BACKGROUND OF THE INVENTION

1. Field of the Invention

The present invention relates to an image sensing apparatus and a method of controlling the image sensing apparatus.

2. Description of the Related Art

Some image sensing apparatuses such as digital cameras and digital video cameras have an operation mode in which still image shooting is done during movie shooting. In the image sensing apparatus, an image sensor such as a CCD sensor or a CMOS sensor includes a pixel array in which a plurality of pixels are arrayed in the row and column directions, and a read circuit for reading out a signal from the pixel array. These days, the number of pixels included in the pixel array tends to increase (megapixel array).

In the operation mode in which movie shooting is done to acquire a plurality of successive frame images, the image sensing apparatus performs an operation suited to movie shooting. More specifically, the image sensing apparatus drives the read circuit to read out signals from the pixel array at a pixel density decreased by addition, decimation, extraction, or the like, so as to read out signals in a readout period in which a frame rate suitable for movie shooting can be achieved.

In the operation mode in which still image shooting is done during movie shooting, the image sensing apparatus executes an operation which gives priority to still image shooting. More specifically, the image sensing apparatus drives the read circuit to read out signals in a readout period longer than the readout period in which a frame rate suitable for movie shooting can be achieved, so as to read out signals from the pixel array at a high pixel density suitable for still image shooting. Also, the image sensing apparatus controls each pixel of the pixel array so as to accumulate a signal at a shutter speed, that is, in an accumulation period suited to still image shooting. In still image shooting, the shutter speed, that is, accumulation period needs to be set shorter than an accumulation period suited to movie shooting (accumulation period in the operation mode in which movie shooting is done), in order to prevent blurring of an image upon the movement of an object.

In the image sensing apparatus, the operation mode sometimes switches between successive frames from the operation mode in which movie shooting is done to the operation mode in which still image shooting is done during movie shooting. In this case, the following two problems arise in the image sensing apparatus.

As described above, the readout period in the operation mode in which still image shooting is done during movie shooting is longer than that in the operation mode in which movie shooting is done. In the image sensing apparatus, a length of a readout period changes discontinuously upon switching between the operation modes, so a length of a frame period changes discontinuously. The continuity of evaluation values for motion detection of an object and the like may be lost (first problem). It may become difficult to standardize discontinuous evaluation values. If a predetermined control operation is performed using such evaluation values, the precision of the control operation may decrease.

For example, if the length of the frame period changes discontinuously, the continuity of evaluation values for motion detection of an object (moving amounts of an object) may be lost. If a control operation such as camera shake correction of the image sensing apparatus is executed using discontinuous moving amounts of an object, the precision of the control operation decreases.

As described above, the accumulation period of each pixel in the operation mode in which still image shooting is done during movie shooting is shorter than that of each pixel in the operation mode in which movie shooting is done. In the image sensing apparatus, a length of an accumulation period of each pixel changes discontinuously upon switching the operation mode, so the level of a signal read out from each pixel changes discontinuously. The continuity of evaluation values for photometry and the like may be lost (second problem). It may become difficult to standardize discontinuous evaluation values. If a predetermined control operation is performed using such evaluation values, the precision of the control operation may decrease.

For example, if the level of a signal read out from each pixel changes discontinuously, the continuity of evaluation values for photometry may be lost. If a control operation (AE control operation) such as exposure compensation of the image sensing apparatus is executed using discontinuous evaluation values for photometry, the precision of the control operation decreases.

A technique disclosed in Japanese Patent Laid-Open No. 09-023371 proposes to keep constant the level of a signal input to an A/D converter by dynamically adjusting the gain of an amplifier (AGC circuit) on the output stage of an image sensor upon detecting a change of the level of a signal read out from each pixel. According to this technique, when a length of a readout period changes discontinuously upon switching between the operation modes and a length of a frame period changes discontinuously, the continuity of evaluation values for motion detection of an object and the like may be lost. The technique disclosed in Japanese Patent Laid-Open No. 09-023371 cannot solve the first problem.

According to this technique, when a length of a accumulation period of each pixel changes discontinuously upon switching between the operation modes and the level of a signal read out from each pixel changes discontinuously, the level of a signal input to the A/D converter may not be able to be kept constant. Even if the gain of the amplifier on the output stage of the image sensor is dynamically adjusted, the adjusted gain may contain an error, failing to keep constant the level of a signal input to the A/D converter. As a result, the signal level changes discontinuously, and the continuity of evaluation values for photometry and the like may be lost. The technique disclosed in Japanese Patent Laid-Open No. 09-023371 cannot solve the second problem.

A technique disclosed in Japanese Patent Laid-Open No. 2005-277513 proposes to read out, from the first pixel group, a signal for generating an evaluation value, and a signal for an EVF image from the second pixel group in a pixel array in which a plurality of pixels are arrayed. Japanese Patent Laid-Open No. 2005-277513 does not disclose an operation of the image sensing apparatus upon switching between the operation modes. The technique disclosed in Japanese Patent Laid-Open No. 2005-277513 can solve neither the first problem nor the second problem.

SUMMARY OF THE INVENTION

It is an aim of the present invention to prevent loss of the continuity of evaluation values based on signals read out from pixels upon switching between the operation modes, and to obtain a image signal suitable for each operation mode.

According to the first aspect of the present invention, there is provided an image sensing apparatus having an operation mode in which images of successive frames are acquired, and an operation mode in which a still image is acquired, the apparatus comprising: a pixel array in which a plurality of pixels arrayed in a row direction and a column direction, the pixel array including a first pixel group and a second pixel group; a first readout unit which reads out a first signal from the first pixel group in a readout period which remains constant regardless of the operation modes; a second readout unit which reads out a second signal from the second pixel group in a readout period selected in accordance with a switched operation mode between the operation modes; and a control unit which controls a performance of generating an evaluation value by using the first signal of the first pixel group, and which controls at least one of image displaying performance and image recording performance by using the second signal of the second pixel group.

According to the second aspect of the present invention, there is provided a method of controlling an image sensing apparatus having an operation mode in which images of successive frames are acquired, and an operation mode in which a still image is acquired, the image sensing apparatus including a pixel array in which a plurality of pixels arrayed in a row direction and a column direction, the pixel array including a first pixel group and a second pixel group, the method comprising: a first readout step of reading out a first signal from the first pixel group in a readout period which remains constant regardless of the operation modes; a second readout step of reading out a second signal from the second pixel group in a readout period selected in accordance with a switched operation mode between the operation modes; and a control step of controlling a performance of generating an evaluation value by using the first signal of the first pixel group, and controlling at least one of image displaying performance and image recording performance by using the second signal of the second pixel group.

The present invention can prevent loss of the continuity of evaluation values based on signals read out from pixels upon switching between the operation modes, and obtain an image signal suitable for each operation mode.

Further features of the present invention will become apparent from the following description of exemplary embodiments with reference to the attached drawings.

BRIEF DESCRIPTION OF THE DRAWINGS

FIG. 5 is a timing chart showing the operation of a pixel interpolation process circuit 107;

FIG. 6 is a timing chart showing the operation of the pixel interpolation process circuit 107;

DESCRIPTION OF THE EMBODIMENTS

The present invention is directed to an image sensing apparatus and, particularly, to an image sensing apparatus having a function of changing the image sensor driving method between successive frames. The image sensing apparatus is, for example, a digital camera or digital video camera. The image sensor is, for example, a CCD sensor or a CMOS sensor.

Preferred embodiments of the present invention will be described in detail below with reference to the accompanying drawings.

(First Embodiment)

Figure 1:
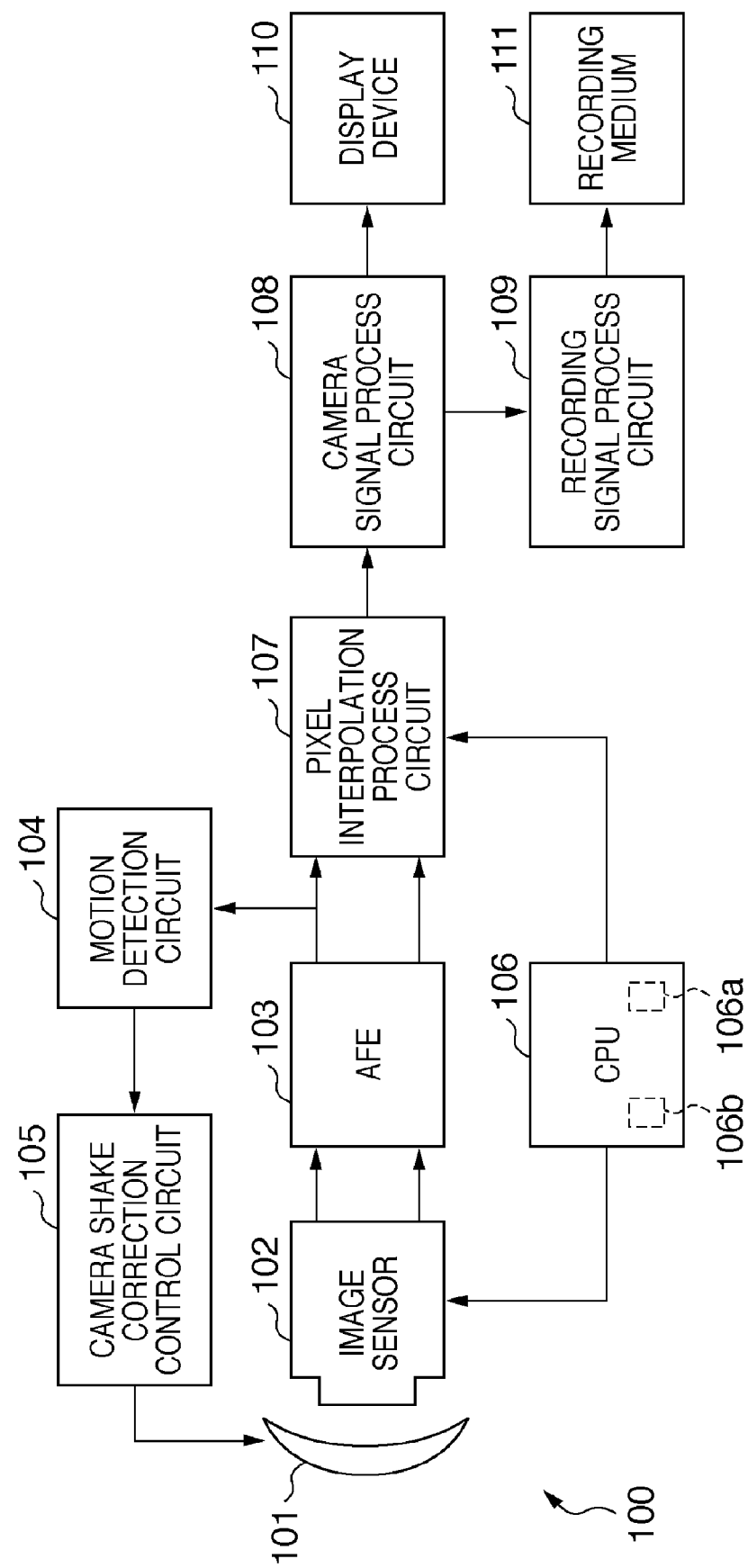
FIG. 1 is a block diagram of the arrangement of an image sensing apparatus 100 according to the first embodiment of the present invention.

An image sensing apparatus 100 according to the first embodiment of the present invention will be explained with reference to FIG. 1. FIG. 1 is a block diagram of the arrangement of the image sensing apparatus 100 according to the first embodiment of the present invention.

When correcting camera shake, a lens unit (photographing optical system) 101 can be driven to cancel a camera shake component. An image sensor 102 includes a plurality of pixel groups from which signals can be read out in independent cycles. The lens unit 101 forms an optical image on the light receiving surface (pixel array to be described later) of the image sensor 102. The image sensor 102 generates and outputs an image signal corresponding to the optical image.

An analog front end (to be simply referred to as an AFE hereinafter) 103 amplifies an image signal output from the image sensor 102, and A/D-converts the amplified signal. The AFE 103 A/D-converts an image signal (analog signal) to generate image data (digital signal).

A motion detection circuit 104 detects motion information (blurring amount of an image) between successive frames on the basis of an input image signal. A camera shake correction control circuit 105 drives the lens unit 101 to cancel a camera shake component on the basis of the motion information (blurring amount of an image) detected by the motion detection circuit 104.

A CPU 106 controls each unit. More specifically, the CPU 106 receives an instruction from the user via an input unit (not shown) to designate an operation mode. The CPU 106 controls each unit in accordance with an operation mode corresponding to the instruction, that is, an operation mode designated among a plurality of operation modes. The operation modes include an operation mode in which still image shooting is done during movie shooting, and an operation mode in which movie shooting is done. The CPU 106 includes a selection unit 106a and determination unit 106b. The operations of the selection unit 106a and determination unit 106b will be described later.

A pixel interpolation process circuit 107 interpolates image data output from the AFE 103. A camera signal process circuit 108 performs a predetermined camera signal process. Reference numeral 109 denotes a recording signal process circuit. A display device 110 is, for example, a liquid crystal panel for displaying a movie corresponding to image data. A recording medium 111 is, for example, a DVD disk. The recording signal process circuit 109 records a shot movie (movie corresponding to image data) on the recording medium 111.

Figure 2:
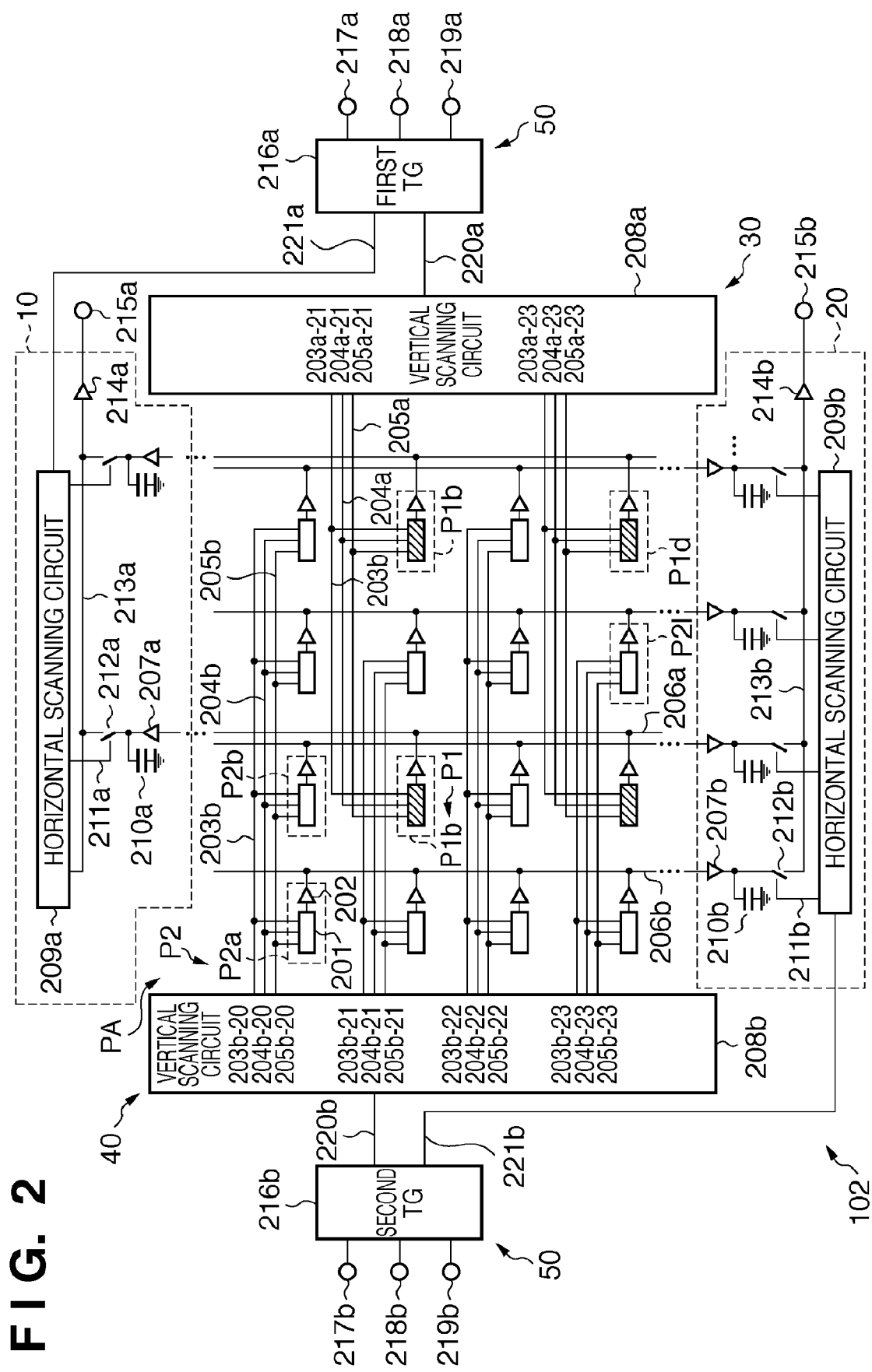
FIG. 2 is a circuit diagram of the arrangement of an image sensor.

The arrangement of the image sensor 102 will be explained with reference to FIG. 2. FIG. 2 is a circuit diagram of the arrangement of the image sensor 102.

The image sensor 102 includes a pixel array PA, readout units 10 and 20, control units 30 and 40, and a timing generation unit 50.

In the pixel array PA, a plurality of pixels are arrayed in the row and column directions. In the example of FIG. 2, 4×4 pixels are arrayed. A plurality of pixels include a pixel group P1 including pixels P1a to P1d, and a pixel group P2 including pixels P2a to P2l. Each of the pixels P1a to P1d and P2a to P2*l* includes an accumulation unit 201, and a floating diffusion amplifier (to be simply referred to as an FD amplifier hereinafter) 202.

The control unit 30 controls the accumulation operation of the pixel group P1 of the pixels P1*a* to P1*d* so as to accumulate signals in a set accumulation period. The control unit 30 includes a vertical scanning circuit 208*a*. The vertical scanning circuit 208*a* selects a pixel among the pixels P1*a* to P1*d* of the pixel group P1 via row selection lines 205*a* (e.g., reference numerals 205*a*-21 and 205*a*-23 denote row selection lines for the 21st and 23rd rows). The vertical scanning circuit 208*a* causes each of the pixels P1*a* to P1*d* of the pixel group P1 to perform a reset operation, via row reset control lines 204*a* (e.g., reference numerals 204*a*-21 and 204*a*-23 denote row reset control lines for the 21st and 23rd rows). The vertical scanning circuit 208*a* causes each of the pixels P1*a* to P1*d* of the pixel group P1 to perform a readout operation, via row readout control lines 203*a* (e.g., reference numerals 203*a*-21 and 203*a*-23 denote row readout control lines for the 21st and 23rd rows). That is, the accumulation operation of the pixels P1*a* to P1*d* of the pixel group P1 is controlled to start at the timing when the reset operation is complete, and end at the timing when the readout operation starts.

The control unit 40 controls the accumulation operation of the pixel group P2 of the pixels P2*a* to P2*l* so as to accumulate signals in a set accumulation period. The control unit 40 includes a vertical scanning circuit 208*b*. The vertical scanning circuit 208*b* selects a pixel among the pixels P2*a* to P2*l* of the pixel group P2 via row selection lines 205*b* (e.g., reference numerals 205*b*-20 to 205*b*-23 denote row selection lines for the 20th to 23rd rows). The vertical scanning circuit 208*b* causes each of the pixels P2*a* to P2*l* of the pixel group P2 to perform a reset operation, via row reset control lines 204*b* (e.g., reference numerals 204*b*-20 to 204*b*-23 denote row reset control lines for the 20th to 23rd rows). The vertical scanning circuit 208*b* causes each of the pixels P2*a* to P2*l* of the pixel group P2 to perform a readout operation, via row readout control lines 203*b* (e.g., reference numerals 203*b*-20 to 203*b*-23 denote row readout control lines for the 20th to 23rd rows). That is, the accumulation operation of the pixels P2*a* to P2*l* of the pixel group P2 is controlled to start at the timing when the reset operation is complete, and end at the timing when the readout operation starts.

The readout unit 10 reads out signals from the pixels P1*a* to P1*d* of the pixel group P1 via column signal lines 206*a* in the readout period. The signal is used to generate an evaluation value. The readout unit 10 includes column amplifiers 207*a*, a horizontal scanning circuit 209*a*, column signal buffer capacitors 210*a*, column selection switches 212*a*, and an output buffer amplifier 214*a*. Each column amplifier 207*a* amplifies a signal read out from a corresponding one of the pixels P1*a* to P1*d* of the pixel group P1, and outputs the amplified signal to the column signal buffer capacitor 210*a*. The column signal buffer capacitor 210*a* holds the signal for a predetermined period. The column selection switch 212*a* is turned on upon receiving an active level signal from the horizontal scanning circuit 209*a* via a corresponding column selection line 211*a*. When the column selection switch 212*a* is turned on, it transfers the signal held in the column signal buffer capacitor 210*a* to the output buffer amplifier 214*a* via a horizontal signal line 213*a*. The output buffer amplifier 214*a* amplifies the signal, and outputs the amplified signal as an image signal to the AFE 103 (see FIG. 1) via an image signal output terminal 215*a*.

The readout unit 20 reads out signals from the pixels P2*a* to P2*l* of the pixel group P2 via column signal lines 206*b* in the readout period. The signal is used for at least one of image displaying and image recording. The readout unit 20 includes column amplifiers 207*b*, a horizontal scanning circuit 209*b*, column signal buffer capacitors 210*b*, column selection switches 212*b*, and an output buffer amplifier 214*b*. Each column amplifier 207*b* amplifies a signal read out from a corresponding one of the pixels P2*a* to P2*l* of the pixel group P2, and outputs the amplified signal to the column signal buffer capacitor 210*b*. The column signal buffer capacitor 210*b* holds the signal for a predetermined period. The column selection switch 212*b* is turned on upon receiving an active level signal from the horizontal scanning circuit 209*b* via a corresponding column selection line 211*b*. When the column selection switch 212*b* is turned on, it transfers the signal held in the column signal buffer capacitor 210*b* to the output buffer amplifier 214*b* via a horizontal signal line 213*b*. The output buffer amplifier 214*b* amplifies the signal, and outputs the amplified signal as an image signal to the AFE 103 (see FIG. 1) via an image signal output terminal 215*b*.

The timing generation unit 50 includes a timing generator (to be simply referred to as a first TG hereinafter) 216*a* and a timing generator (to be simply referred to as a second TG hereinafter) 216*b*.

The first TG 216*a* receives a vertical sync signal from the CPU 106 via a vertical sync signal input terminal 217*a*. The first TG 216*a* generates a readout row timing signal 220*a* in accordance with the vertical sync signal, and supplies it to the vertical scanning circuit 208*a* of the control unit 30. The control unit 30 uses the readout row timing signal 220*a* to control the accumulation operation of the pixel group P1 in a set accumulation period.

The first TG 216*a* receives a horizontal sync signal from the CPU 106 via a horizontal sync signal input terminal 218*a*. The first TG 216*a* generates a readout column timing signal 221*a* in accordance with the horizontal sync signal, and supplies it to the vertical scanning circuit 208*a* of the readout unit 10. The readout unit 10 uses the readout column timing signal 221*a* to read out a signal in a set readout period.

The second TG 216*b* receives a vertical sync signal from the CPU 106 via a vertical sync signal input terminal 217*b*. The selection unit 106*a* of the CPU 106 selects an accumulation period from a plurality of accumulation periods in accordance with the operation mode when the control unit 40 controls the accumulation operation of the pixel group P2. The CPU 106 generates a vertical sync signal corresponding to the accumulation period selected by the selection unit 106*a*, and supplies it to the second TG 216*b*. The second TG 216*b* generates a readout row timing signal 220*b* in accordance with the vertical sync signal, and supplies it to the vertical scanning circuit 208*b* of the readout unit 20. The control unit 40 uses the readout row timing signal 220*b* to control the accumulation operation of the pixel group P2 in the selected accumulation period.

The second TG 216*b* receives a horizontal sync signal from the CPU 106 via a horizontal sync signal input terminal 218*b*. The selection unit 106*a* of the CPU 106 selects a readout period from a plurality of readout periods in accordance with the operation mode when the readout unit 20 reads out a signal. The CPU 106 generates a horizontal sync signal corresponding to the readout period selected by the selection unit 106*a*, and supplies it to the second TG 216*b*. The second TG 216*b* generates a readout column timing signal 221*b* in accordance with the horizontal sync signal, and supplies it to the vertical scanning circuit 208*b* of the readout unit 20. The readout unit 20 uses the readout column timing signal 221*b* to read out a signal in the selected readout period.

The timing generation unit 50 may also be arranged outside the image sensor 102.

Figure 3:
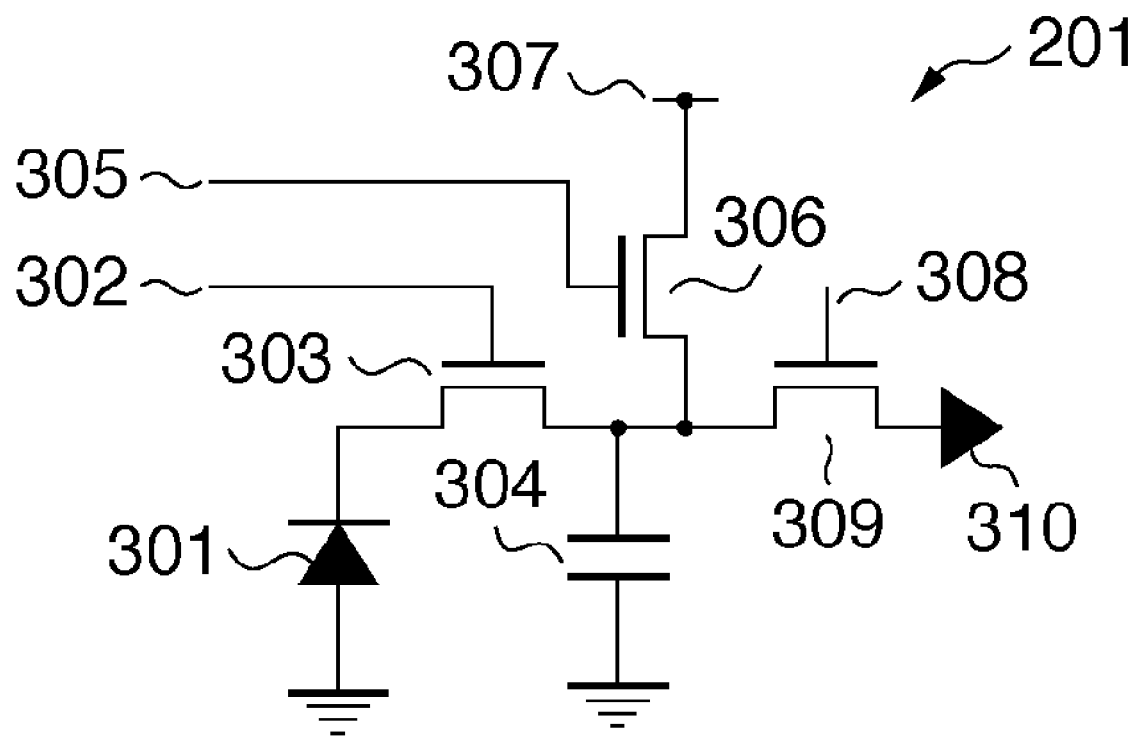
FIG. 3 is a circuit diagram of the arrangement of an accumulation unit 201 included in each of pixels.

The arrangement of the accumulation unit 201 included in each of pixels will be explained with reference to FIG. 3. FIG. 3 is a circuit diagram of the arrangement of the accumulation unit 201 included in each of pixels. The pixels P1a to P1d of the pixel group P1 and the pixels P2a to P2l of the pixel group P2 include the accumulation unit 201 having the same arrangement.

A photodiode (to be simply referred to as a PD hereinafter) 301 generates a signal (charges) in accordance with the quantity of incident light, and accumulates it.

A readout control input 302 is connected to the row readout control line 203a or 203b (see FIG. 2). A readout transistor 303 receives a readout control signal at the gate from the vertical scanning circuit 208a or 208b via the readout control input 302. The readout transistor 303 is turned on upon receiving an active level readout control signal.

Reference numeral 304 denotes a floating diffusion (to be simply referred to as an FD hereinafter). An output terminal 310 functions as an input terminal of the FD amplifier 202 (see FIG. 2). When the readout transistor 303 is turned on, a signal (charges) accumulated in the PD 301 is transferred from the PD 301 to the FD 304. The FD 304 is formed from a predetermined capacitance, and converts charges in the capacitance into a voltage.

A reset control input 305 is connected to the row reset control line 204a or 204b (see FIG. 2). Reference numeral 306 denotes a reset transistor; 307, a reset-level input. The reset transistor 306 receives a reset control signal at the gate from the vertical scanning circuit 208a or 208b via the reset control input 305. Upon receiving an active level reset control signal, the reset transistor 306 is turned on to reset the potential of the FD 304 to a reset-level supplied via the reset-level input 307 from a reset-level power supply.

A selection control input 308 is connected to the row selection line 205a or 205b (see FIG. 2). A selection transistor 309 receives a selection control signal at the gate from the vertical scanning circuit 208a or 208b via the selection control input 308. The selection transistor 309 is turned on upon receiving an active level selection control signal. While the selection transistor 309 is ON, the FD 304 outputs a converted signal (voltage) to the FD amplifier 202 via the output terminal 310. The FD amplifier 202 amplifies the received signal, and outputs it to the column signal line 206a or 206b.

The operation of the image sensor 102 will be explained with reference to FIGS. 2 and 3.

The PDs 301 of the pixels P1a to P1d and P2a to P2l of the pixel array PA accumulate signals in accordance with the quantity of incident light. In each of the pixels P1a to P1d and P2a to P2l, the reset transistor 306 is turned on upon receiving an active level reset control signal from the reset control input 305. Then, the reset transistor 306 resets the FD 304 to a reset-level (e.g. a level of power supply VDD). The potential of the FD 304 changes to a reset-level potential. The FD 304 outputs the reset-level potential to the output terminal 310, and the FD amplifier 202 outputs a noise signal corresponding to the reset-level potential to the column signal line 206a or 206b. In the readout unit 10 or 20, the column amplifier 207a or 207b receives the noise signal output to the column signal line 206a or 206b.

Then, in each of the pixels P1a to P1d and P2a to P2l, when the readout control input 302 receives an active level readout control signal, the readout transistor 303 is turned on. The readout transistor 303 transfers a signal accumulated in the PD 301 to the FD 304. The potential of the FD 304 changes to an optical signal-level potential. The FD 304 outputs the optical signal-level potential to the output terminal 310, and the FD amplifier 202 outputs an optical signal corresponding to the optical signal-level potential to the column signal line 206a or 206b. In the readout unit 10 or 20, the column amplifier 207a or 207b receives the optical signal output to the column signal line 206a or 206b. The column amplifier 207a or 207b performs a clamp operation to calculate the difference between the noise signal and the optical signal, obtaining a difference signal. The column amplifier 207a or 207b outputs the difference signal to the column signal buffer capacitor 210a or 210b. The column signal buffer capacitor 210a or 210b holds the difference signal for a predetermined period. The horizontal scanning circuit 209a or 209b sequentially turns on the column selection switches 212a or 212b of respective columns. Then, the difference signals of one row charged in the column signal buffer capacitors 210a or 210b are sequentially transferred column by column to the output buffer amplifier 214a or 214b. The output buffer amplifier 214a or 214b amplifies the transferred signals, and outputs them as an image signal to the AFE 103 via the image signal output terminal 215a or 215b.

Figure 4:
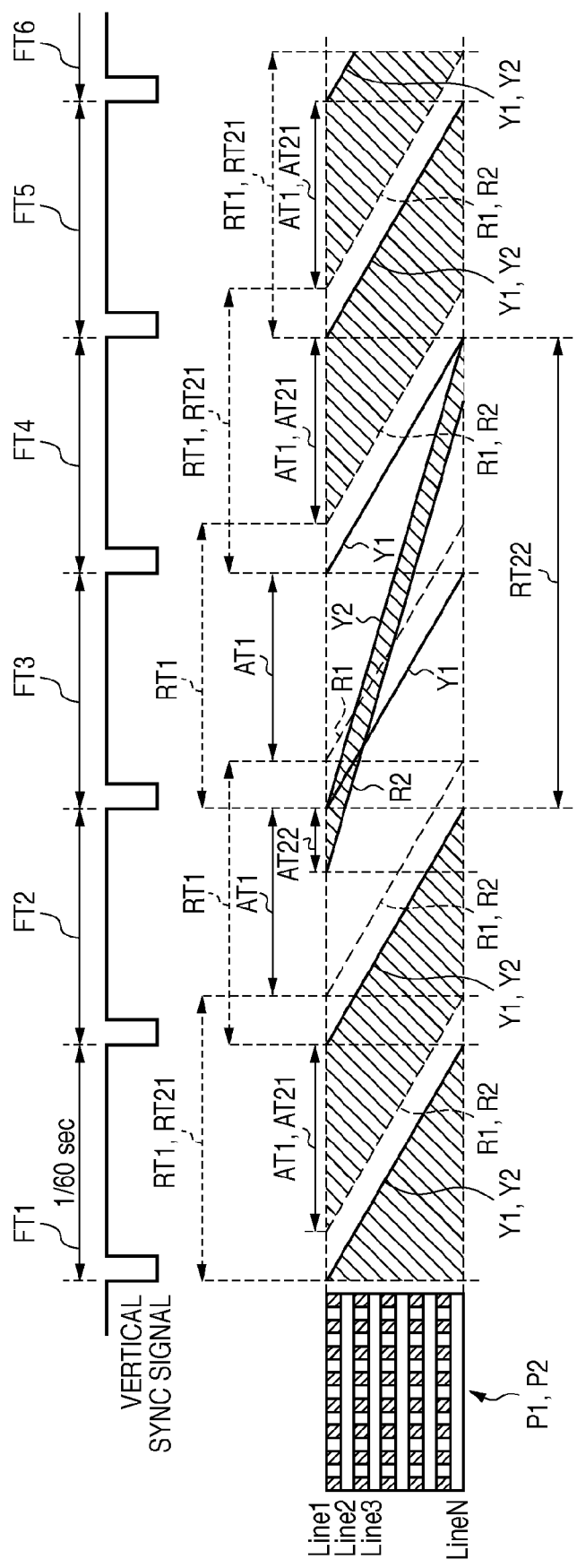
FIG. 4 is a timing chart showing the timings of reset and readout operations in a plurality of pixel groups.

The operation of the image sensing apparatus 100 when the operation mode in which movie shooting is done switches to the operation mode in which still image shooting is done during movie shooting will be explained with reference to FIG. 4. FIG. 4 is a timing chart showing the timings of reset and readout operations in a plurality of pixel groups. In FIG. 4, the ordinate axis represents the position of the row of a pixel in each pixel group, and the abscissa axis represents the timing. Although the number of rows of the pixel group P1 is smaller than that of the pixel group P2 in practice, FIG. 4 shows a case where the number of rows of the pixel group P1 are converted to the same number (N) as that of the pixel group P2.

In FIG. 4, periods FT1 to FT6 are frame periods divided by vertical sync signals, and each period is a $\frac{1}{60}$-sec cycle for an NTCS standard signal. In FIG. 4, the periods FT1, FT2, FT5, and FT6 are frame periods in which the image sensing apparatus 100 operates in the operation mode in which movie shooting is done. The periods FT3 and FT4 are frame periods in which the image sensing apparatus 100 operates in the operation mode in which still image shooting is done during movie shooting. More specifically, in the frame periods FT2 and FT3, the operation mode of the image sensing apparatus 100 switches from the operation mode in which movie shooting is done to the operation mode in which still image shooting is done during movie shooting. In the frame periods FT4 and FT5, the operation mode of the image sensing apparatus 100 switches from the operation mode in which still image shooting is done during movie shooting to the operation mode in which movie shooting is done.

In FIG. 4, Y1 and Y2 are respectively timings when the pixels of the pixel groups P1 and P2 perform the readout operation, that is, timings when the accumulation operation of the pixels ends. The vertical scanning circuits 208a and 208b respectively control the pixel groups P1 and P2 to execute the readout operation sequentially from a start row Line 1 in synchronism with the timings of respective vertical sync signals. Thus, the timings Y1 and Y2 are indicated by oblique lines.

R1 and R2 respectively represent timings when the pixels of the pixel groups P1 and P2 complete the reset operation, that is, timings when the accumulation operation of the pixels starts. The vertical scanning circuits 208a and 208b respectively control the pixel groups P1 and P2 to complete the reset operation sequentially from the start row Line 1 in synchronism with the timings of respective vertical sync signals. Thus, the timings R1 and R2 are indicated by oblique lines.

In the operation mode in which movie shooting is done, the selection unit 106a of the CPU 106 selects an accumulation period AT21 from accumulation periods AT21 and AT22 so as to be able to accumulate a signal in an accumulation period suited to movie shooting. The second TG 216b of the timing generation unit 50 drives the control unit 40 to control the accumulation operation of the pixel group P2 in the selected accumulation period AT21.

In the operation mode in which movie shooting is done, the selection unit 106a of the CPU 106 selects a readout period RT21 from readout periods RT21 and RT22 so as to be able to achieve a frame rate suited to movie shooting. The second TG 216b of the timing generation unit 50 drives the readout unit 20 to read out signals from the pixel group P2 at a pixel density decreased by addition, decimation, extraction, or the like in the readout period RT21. As a method of decreasing the pixel density of readout pixels in the pixel group P2, the rows of pixels may be added or decimated. The embodiment will explain an example of reading out signals from the pixel group P2 (see FIG. 2) every other row. When the total number of rows of the pixel group P2 is N, signals are read out from N/2 rows.

In the operation mode in which still image shooting is done during movie shooting, the image sensing apparatus 100 performs an operation which gives priority to still image shooting. The selection unit 106a of the CPU 106 selects the accumulation period AT22 from the accumulation periods AT21 and AT22 so as to be able to accumulate a signal at a shutter speed, that is, in an accumulation period suited to still image shooting. The second TG 216b of the timing generation unit 50 drives the control unit 40 to control the accumulation operation of the pixel group P2 in the selected accumulation period AT22.

In the operation mode in which still image shooting is done during movie shooting, the selection unit 106a of the CPU 106 selects the readout period RT22 from the readout periods RT21 and RT22 so as to read out signals from the pixel group P2 at a high pixel density suited to still image shooting. The readout period RT22 selected in the operation mode in which still image shooting is done during movie shooting is longer than the readout period RT21 selected in the operation mode in which movie shooting is done. For example, the readout period RT22 is double longer than the readout period RT21 selected in the operation mode in which movie shooting is done.

The first TG 216a of the timing generation unit 50 drives the control unit 30 to control the accumulation operation of the pixel group P1 in an accumulation period AT1 which remains constant regardless of the operation mode (the operation mode in which still image shooting is done during movie shooting, or the operation mode in which movie shooting is done).

The first TG 216a of the timing generation unit 50 drives the readout unit 10 to read out a signal from the pixel group P1 in a readout period RT1 which remains constant regardless of the operation mode (the operation mode in which still image shooting is done during movie shooting, or the operation mode in which movie shooting is done). Since the number of pixels of the pixel group P1 is smaller than that of the pixel group P2 (see FIG. 2), the readout unit 10 can be driven to read out signals from all the pixels of the pixel group P1 in the readout period RT1.

The operations of the motion detection circuit 104 and camera shake correction control circuit 105 will be explained with reference to FIG. 1.

The motion detection circuit 104 receives signals (image data) which is output from the pixel group P1 of the image sensor 102 and processed by the AFE 103. The motion detection circuit 104 detects the motion of an object by using the signals of successive frames. A concrete example of the detection method is to calculate the correlation between the signals of previous and current frames from each pixel while shifting the relative coordinate point, and setting a coordinate point having the highest correlation as motion information between frames. The interval between pixels discretely arranged in the pixel group P1 shown in FIG. 2 suffices to be a proper one in accordance with a resolution necessary for the correlation calculation and motion information. The motion detection circuit 104 outputs motion amount information concerning an object to the camera shake correction control circuit 105.

The camera shake correction control circuit 105 extracts a camera shake component on the basis of the motion amount information. The camera shake correction control circuit 105 controls the lens unit 101 to cancel the camera shake component.

The operation of the pixel interpolation process circuit 107 will be explained with reference to FIGS. 5 and 6. FIGS. 5 and 6 are timing charts showing the operation of the pixel interpolation process circuit 107.

Signals read out from the pixel groups P1 and P2 are output from the different image signal output terminals 215a and 215b (see FIG. 2). These signals are processed via the AFE 103, and supplied to the pixel interpolation process circuit 107. The CPU 106 controls the pixel interpolation process circuit 107 to perform a pixel interpolation process by using at least signals (image data) of the pixel group P2.

The determination unit 106b of the CPU 106 determines whether the accumulation period of each pixel in the pixel group P1 is equal to the selected accumulation period of each pixel in the pixel group P2. Also, the determination unit 106b of the CPU 106 determines whether the readout period for the readout unit 10 is equal to the selected readout period for the readout unit 20. If the determination unit 106b determines that at least one of the condition that the accumulation period is equal to a selected one and the condition that the readout period is equal to a selected one is satisfied, the CPU 106 controls the pixel interpolation process circuit 107 as shown in FIG. 5. That is, as shown in FIG. 5, the CPU 106 controls the pixel interpolation process circuit 107 to generate image signals (image data) of one frame by using (synthesizing) signals of the pixel groups P1 and P2, and output them to the camera signal process circuit 108.

More specifically, the CPU 106 generates a pixel interpolation control signal for each pixel in accordance with layout information of the pixel groups P1 and P2 in the image sensor 102, and vertical and horizontal addresses. The CPU 106 outputs the pixel interpolation control signal to the pixel interpolation process circuit 107. The pixel interpolation process circuit 107 outputs the signal as an image signal when the pixel interpolation control signal is 0, and as an image signal when the pixel interpolation control signal is 1. As a result, image signals are output in the order of pixels arrayed in the pixel array PA.

The pixel interpolation process circuit 107 may also obtain the signal of a skipped pixel by averaging the signals of pixels adjacent to the skipped pixel.

If the determination unit 106b of the CPU 106 determines that neither the condition that the accumulation period is equal to a selected one nor the condition that the readout period is equal to a selected one is satisfied, the CPU 106 controls the pixel interpolation process circuit 107 as shown in FIG. 6. That is, as shown in FIG. 6, the CPU 106 controls the pixel interpolation process circuit 107 to generate image signals (image data) of one frame by using signals of the pixel group P2 without using signals of the pixel group P1, and output them to the camera signal process circuit 108.

More specifically, the CPU 106 controls the pixel interpolation process circuit 107 to output the signal as an image signal when the pixel interpolation control signal is 0, and generate the signal of a skipped pixel among signals by interpolating the signal using the signals of neighboring pixels in the pixel group P2 when the pixel interpolation control signal is 3. For example, when signals are read out from the pixel group P2 every other row, the average value of the signals of pixels above and below a skipped pixel is output as an interpolation value. For example, when signals are read out from the pixel group P2 every other column, the average value of the signals of pixels on the right and left sides of a skipped pixel is output as an interpolation value. When color filters of different colors are arranged on the image sensor, the signal of a skipped pixel needs to be interpolated using pixels of the same color as that of the skipped pixel.

As described above, according to the first embodiment, in the pixel array PA of the image sensor 102 of the image sensing apparatus 100, the pixel group P1 is connected to the control unit 30 and readout unit 10, and the pixel group P2 is connected to the control unit 40 and readout unit 20. This arrangement makes it possible to read out signals independently from the pixel groups P1 and P2.

Each pixel of the pixel group P1 accumulates a signal in an accumulation period which remains constant regardless of the operation mode. A signal for generating an evaluation value is read out from the pixel group P1 in a readout period which remains constant regardless of the operation mode. This can prevent the discontinuity of evaluation values based on signals output from the pixel group P1 upon switching between the operation modes.

Each pixel of the pixel group P2 accumulates a signal in an accumulation period selected from a plurality of accumulation periods in accordance with the operation mode. A signal for at least one of image displaying and image recording is read out from the pixel group P2 in a readout period selected from a plurality of readout periods in accordance with the operation mode. A signal accumulated in an accumulation period suitable for the operation mode can be read out in a readout period suitable for the operation mode upon switching between the operation modes.

The first embodiment can, therefore, prevent loss of the continuity of evaluation values based on signals read out from pixels upon switching between the operation modes, and obtain an image signal suitable for each operation mode.

The pixel interpolation process circuit 107 may also generate an image signal in accordance with only whether the readout period is equal to a selected one. More specifically, when the determination unit 106b determines that the readout period is equal to a selected one, the pixel interpolation process circuit 107 generates image signals of one frame by using signals from the pixel groups P1 and P2. When the determination unit 106b determines that the readout period is different from a selected one, the pixel interpolation process circuit 107 generates image signals of one frame by using signals read out from the pixel group P2.

Alternatively, the pixel interpolation process circuit 107 may also generate an image signal in accordance with only whether the accumulation period is equal to a selected one. More specifically, when the determination unit 106b determines that the accumulation period is equal to a selected one, the pixel interpolation process circuit 107 generates image signals of one frame by using signals from the pixel groups P1 and P2. When the determination unit 106b determines that the accumulation period is different from a selected one, the pixel interpolation process circuit 107 generates image signals of one frame by using signals read out from the pixel group P2.

(Second Embodiment)

Figure 7:
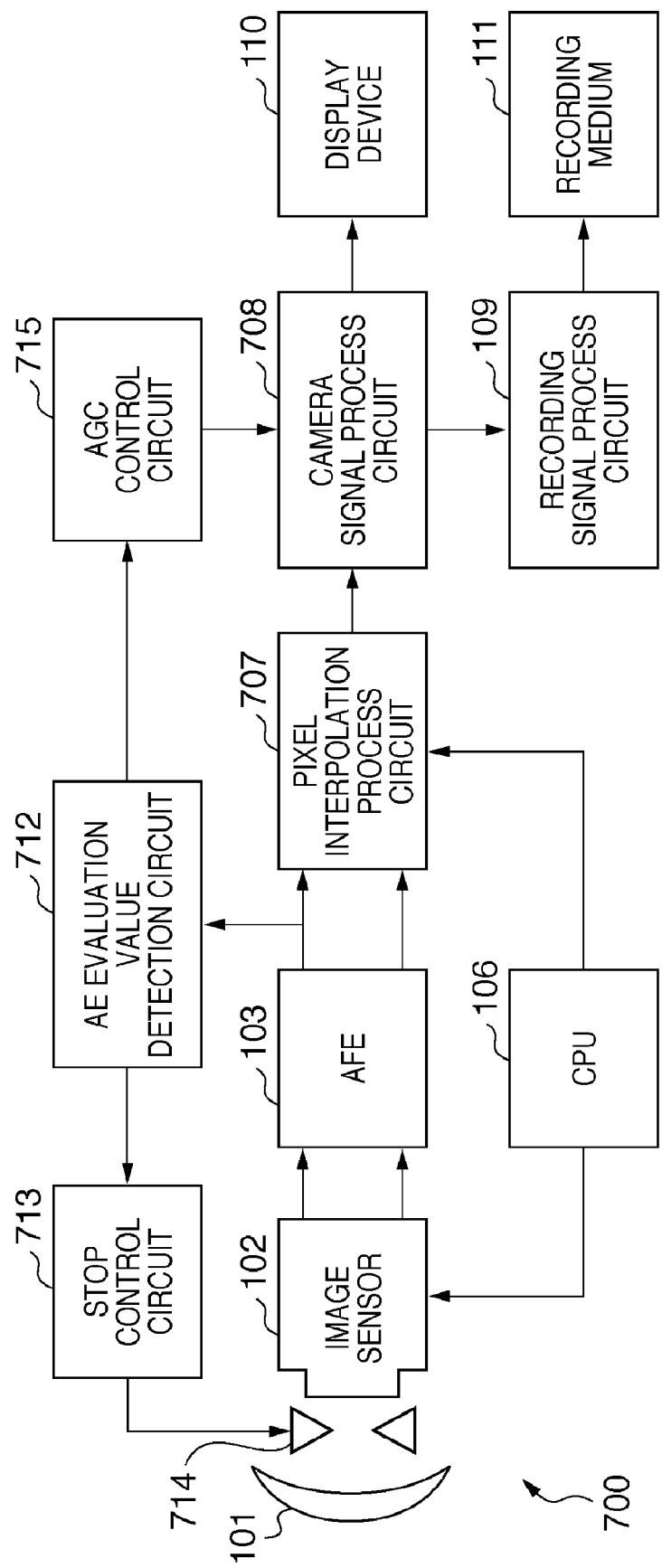
FIG. 7 is a block diagram of the arrangement of an image sensing apparatus 700 according to the second embodiment of the present invention.

An image sensing apparatus 700 according to the second embodiment of the present invention will be explained with reference to FIG. 7. FIG. 7 is a block diagram of the arrangement of the image sensing apparatus 700 according to the second embodiment of the present invention. A difference from the first embodiment will be mainly explained, and a description of the same part will not be repeated.

A stop 714 adjusts the quantity of light guided from the lens unit 101 to the image sensor 102. In other words, the stop 714 adjusts the exposure of the pixel array of the image sensor 102.

An AE evaluation value detection circuit (brightness detection means) 712 detects the brightness of an object by using a signal. For example, the AE evaluation value detection circuit 712 obtains an AE evaluation value by detecting a brightness of an object between successive frames using the signals of the successive frames. For example, the AE evaluation value detection circuit 712 obtains an AE evaluation value by detecting the brightness of the object in each frame by using the signal of the frame.

A stop control circuit 713 controls the aperture value on the basis of the AE evaluation value detected by the AE evaluation value detection circuit 712. The stop control circuit 713 controls the opening degree (aperture value) of the stop 714 to control the exposure of a pixel array PA (see FIG. 2).

Based on the AE evaluation value detected by the AE evaluation value detection circuit 712, an AGC control circuit (gain control unit ) 715 controls the gain (amplification factor) when a camera signal process circuit 708 amplifies an image signal (image data).

The stop control circuit 713 and AGC control circuit 715 control the aperture value and gain on the basis of the AE evaluation value detected by the AE evaluation value detection circuit 712 so as to make the brightness level of an object constant.

The camera signal process circuit (amplification means) 708 receives gain information from the AGC control circuit 715. The camera signal process circuit 708 amplifies image signals of one frame at an amplification factor corresponding to the gain. The camera signal process circuit 708 outputs the amplified image signal to a display device 110 or recording signal process circuit 109.

The operation of the image sensing apparatus 700 when switching from the operation mode in which movie shooting is done to the third operation mode is different from that in the first embodiment as follows.

Figure 8:
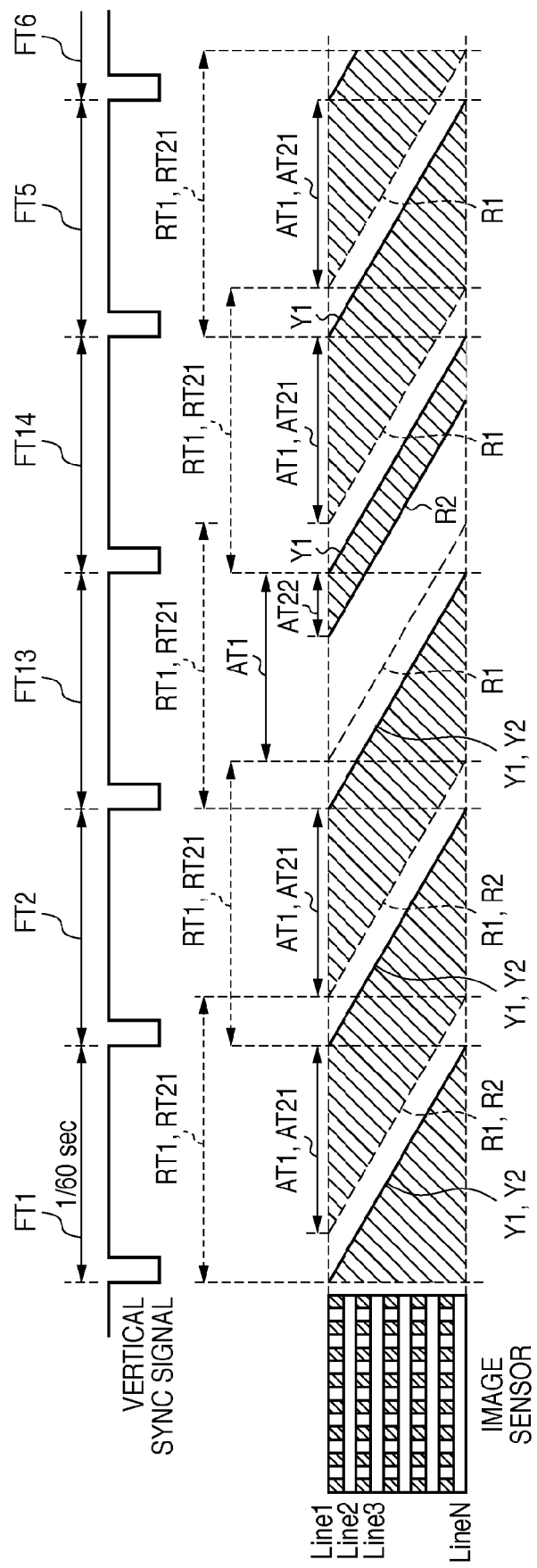
FIG. 8 is a timing chart showing the timings of reset and readout operations in a plurality of pixel groups.

In FIG. 8, periods FT1, FT2, FT5, and FT6 are frame periods in which the image sensing apparatus 700 operates in the operation mode in which movie shooting is done. Periods FT13 and FT14 are frame periods in which the image sensing apparatus 700 operates in the third operation mode. More specifically, in the frame periods FT2 and FT13, the operation mode of the image sensing apparatus 700 switches from the operation mode in which movie shooting is done to the third operation mode. In the frame periods FT14 and FT5, the operation mode of the image sensing apparatus 700 switches from the third operation mode to the operation mode in which movie shooting is done. In the third operation mode, while controlling the accumulation operation of a pixel group P2 in an accumulation period suitable for still image shooting, it is controlled to read out a signal from the pixel group P2 in a readout period suitable for movie shooting. The third operation mode has in common with the operation mode in which still image shooting is done during movie shooting, in the aspect that still image shooting is executed during movie shooting.

In the third operation mode, the image sensing apparatus 700 controls the accumulation operation of the pixel group P2 in an accumulation period suited to still image shooting. A selection unit 106a of a CPU 106 selects the accumulation period AT22 from the accumulation periods AT21 and AT22 so as to be able to accumulate a signal at a shutter speed, that is, in an accumulation period suited to still image shooting. A second TG 216b of a timing generation unit 50 drives a control unit 40 to control the accumulation operation of the pixel group P2 in the selected accumulation period AT22.

In the third operation mode, the image sensing apparatus 700 controls to read out a signal from the pixel group P2 in a readout period suited to movie shooting. The selection unit 106a of the CPU 106 selects the readout period RT21 from the readout periods RT21 and RT22 so as to achieve a frame rate suited to movie shooting. The readout period RT21 selected in the third operation mode is equal to the readout period RT21 selected in the operation mode in which movie shooting is done. In this aspect, the third operation mode is different from the operation mode in which still image shooting is done during movie shooting.

Figure 9:
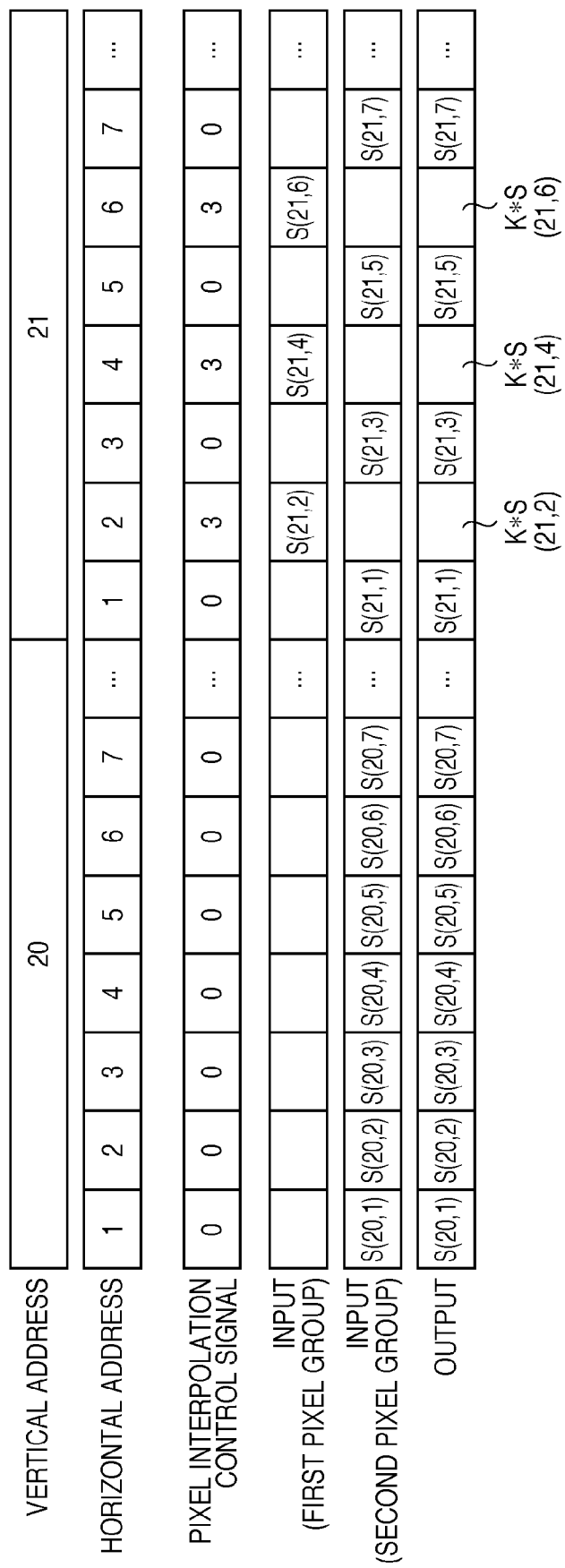
FIG. 9 is a timing chart showing the operation of a pixel interpolation process circuit 707.

The operation of a pixel interpolation process circuit 707 will be explained with reference to FIG. 9. FIG. 9 is a timing chart showing the operation of the pixel interpolation process circuit 707.

The CPU 106 controls the pixel interpolation process circuit 707 to perform a pixel interpolation process by using at least signals (image data) of the pixel group P2.

A determination unit 106b of the CPU 106 determines whether the accumulation period is equal to a selected one. If the determination unit 106b of the CPU 106 determines that the accumulation period is equal to a selected one, the CPU 106 controls the pixel interpolation process circuit 707 as follows. That is, the CPU 106 controls the pixel interpolation process circuit 707 to generate image signals (image data) of one frame by using signals read out from the pixel groups P1 and P2, and output them to the camera signal process circuit 708.

The pixel interpolation process circuit 707 may also obtain the signal of a skipped pixel by a method to be described later.

If the determination unit 106b of the CPU 106 determines that the accumulation period is equal to a selected accumulation period, the CPU 106 controls the pixel interpolation process circuit 707 as shown in FIG. 9. That is, as shown in FIG. 9, the CPU 106 controls the pixel interpolation process circuit 707 to generate image signals (image data) of one frame by using signals of the pixel group P2 without using signals of the pixel group P1, and output them to the camera signal process circuit 708.

More specifically, the CPU 106 generates a pixel interpolation control signal for each pixel in accordance with the pixel groups of the image sensor, layout information and accumulation time information of the pixel groups, and vertical and horizontal addresses. The CPU 106 outputs the pixel interpolation control signal to the pixel interpolation process circuit 707. When the pixel interpolation control signal is 0, the pixel interpolation process circuit 707 outputs the signal as an image signal. When the pixel interpolation control signal is 3, the pixel interpolation process circuit 707 multiplies the signal of a skipped pixel among signals by a correction coefficient K (=(AT22)/(AT1)) of a signal in the accumulation period AT22 to a signal in the accumulation period AT1. Then, the pixel interpolation process circuit 707 outputs the resultant signals.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-006286, filed Jan. 15, 2008 which is hereby incorporated by reference herein in its entirety.

What is claimed is:

1. An image sensing apparatus having an operation mode in which images of successive frames are acquired, and an operation mode in which a still image is acquired, the apparatus comprising:

a pixel array in which a plurality of pixels arrayed in a row direction and a column direction, the pixel array including a first pixel group and a second pixel group, wherein the first pixel group and the second pixel group are comprised of different pixels with each other;

a first readout unit which reads out a first signal from the first pixel group in a readout period which remains constant regardless of the operation modes;

a second readout unit which reads out a second signal from the second pixel group in a readout period selected in accordance with a switched operation mode between the operation modes; and a control unit which performs a predetermined control operation based on an evaluation value generated by using the first signal of the first pixel group, when the second signal is output from the second pixel group for at least one of image displaying and image recording;

a determination unit which determines whether the readout period of the first readout unit is equal to the selected readout period of the second readout unit; and a signal generation unit which generates an image signal of one frame by using the first signal and the second signal when the determination unit determines that the readout period of the first readout unit is equal to the selected readout period of the second readout unit, and which generates an image signal of one frame by using the second signal when the determination unit determines that the readout period of the first readout unit is different from the selected readout period of the second readout unit.

2. The apparatus according to claim 1, further comprising:

a selection unit which selects, in accordance with the switched operation mode, a readout period when the second readout unit reads out the second signal, from a plurality of readout periods; and a timing generation unit which generates a driving signal for reading out the first signal by the first readout unit in the readout period and supplies the generated driving signal to the first readout unit, and which generates, in accordance with the readout period selected by the selection unit, a driving signal for reading out the second signal by the second readout unit in the selected readout period and supplies the generates driving signal to the second readout unit.

3. The apparatus according to claim 1, further comprising:

a photographing optical system which forms an optical image of an object on the pixel array;

a detection unit which detects a motion amount of the object by using signals of successive frames; and a camera shake correction unit which performs a camera shake correction by driving the photographing optical system in accordance with the motion amount of the object detected by the detection unit.

4. A method of controlling an image sensing apparatus having an operation mode in which images of successive frames are acquired, and an operation mode in which a still image is acquired, the image sensing apparatus including a pixel array in which a plurality of pixels arrayed in a row direction and a column direction, the pixel array including a first pixel group and a second pixel group, wherein the first pixel group and the second pixel group are comprised of different pixels with each other, the method comprising:

- a first readout step of reading out a first signal from the first pixel group in a readout period which remains constant regardless of the operation modes;
- a second readout step of reading out a second signal from the second pixel group in a readout period selected in accordance with a switched operation mode between the operation modes; and
- a control step of performing a predetermined control operation based on an evaluation value generated by using the first signal of the first pixel group, when the second signal is output from the second pixel group for at least one of image displaying and image recording
- a determination step which determines whether the readout period of the first readout step is equal to the selected readout period of the second readout step; and
- a signal generation step which generates an image signal of one frame by using the first signal and the second signal when the determination step determines that the readout period of the first readout step is equal to the selected readout period of the second readout step, and which generates an image signal of one frame by using the second signal when the determination step determines that the readout period of the first readout step is different from the selected readout period of the second readout step.

* * * * *